US011520808B2

(12) United States Patent
Sharma

(10) Patent No.: US 11,520,808 B2
(45) Date of Patent: *Dec. 6, 2022

(54) SYSTEM AND METHOD FOR SYNCHRONIZING DATA BETWEEN COMMUNICATION DEVICES IN A NETWORKED ENVIRONMENT WITHOUT A CENTRAL SERVER

(71) Applicant: Pankaj Sharma, Fairfax, VA (US)

(72) Inventor: Pankaj Sharma, Fairfax, VA (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/271,809

(22) Filed: Feb. 9, 2019

(65) Prior Publication Data

US 2019/0205315 A1 Jul. 4, 2019

Related U.S. Application Data

(63) Continuation of application No. 14/333,489, filed on Jul. 16, 2014, now Pat. No. 10,229,181.

(60) Provisional application No. 61/846,710, filed on Jul. 16, 2013.

(51) Int. Cl.
*G06F 16/20* (2019.01)
*G06F 16/27* (2019.01)
*G06F 16/182* (2019.01)

(52) U.S. Cl.
CPC ........ *G06F 16/275* (2019.01); *G06F 16/1834* (2019.01)

(58) Field of Classification Search
None
See application file for complete search history.

(56) References Cited

U.S. PATENT DOCUMENTS

| 7,103,618 | B1 * | 9/2006 | Tramontano | G06F 16/27 |
| | | | | 707/615 |
| 7,793,002 | B2 * | 9/2010 | Hieb | H04J 3/0679 |
| | | | | 709/248 |
| 2004/0243915 | A1 * | 12/2004 | Doyle | H04L 67/1008 |
| | | | | 714/E11.073 |
| 2010/0235321 | A1 * | 9/2010 | Shukla | G06F 16/178 |
| | | | | 707/610 |
| 2012/0089863 | A1 * | 4/2012 | Goto | G06F 11/2035 |
| | | | | 714/4.11 |
| 2014/0188719 | A1 * | 7/2014 | Poornachandran | G06Q 20/36 |
| | | | | 705/41 |
| 2018/0097845 | A1 * | 4/2018 | Chen | H04W 12/122 |

* cited by examiner

*Primary Examiner* — Jau Shya Meng
(74) *Attorney, Agent, or Firm* — Attentive Law; Paul Ratcliffe

(57) ABSTRACT

The invention provides for a cloud-based solution that saves all the data in the cloud storage. The peer devices synchronize data among each other independent of the operating system since the data is synced via web services. Synchronization of data among peer devices is possible even when cloud service is unavailable via a router, Wi-Fi, Bluetooth, NFC or any other mechanism. The peer devices form a hierarchical structure, which designates a master, and the master communicates with the cloud-based service to synchronize data. The master then synchronizes data with the other peer devices in the hierarchy. New devices can be added to the peer devices and can join the hierarchy.

10 Claims, 5 Drawing Sheets

SYSTEM AND METHOD FOR SYNCHRONIZING DATA BETWEEN COMMUNICATION DEVICES IN A NETWORKED ENVIRONMENT WITHOUT A CENTRAL SERVER

CROSS REFERENCE TO RELATED APPLICATION

The present application is a continuation of and claims priority to U.S. patent application Ser. No. 14/333,489 filed Jul. 16, 2014, entitled "System and Method for Synchronizing Data Between Communication Devices in a Networked Environment without a Central Server" which claims priority to U.S. Provisional Patent Application 61/846,710 filed on Jul. 16, 2013, entitled "System and Method for Synchronizing Data Between Communication Devices in a Networked Environment without a Central Server", the entirety of both are incorporated herein.

BACKGROUND OF THE INVENTION

1. Field of the Invention

The present invention relates generally to the field of network communication. More specifically to synchronizing data shared among peer devices via wired or wireless networks without the need of a dedicated central server.

2. Description of the Related Art

Networked devices often need to communicate with each other to share information. For example, the need often arises in the communication between client and server applications such as email applications. A typical email system comprises a server component (e.g., Microsoft Exchange Server) and a client component (e.g., Microsoft Outlook or Microsoft Outlook Express). These components are typically software applications that are configured to execute on computing devices (e.g., servers, PCs, laptops, tablets, and smartphones).

However, existing methods of communication between network devices are unsatisfactory because they require various servers and PCs at various facilities, and because a loss in connectivity between a client and server application disables data synchronization with computing devices.

Additionally, existing systems often employ dedicated data back-up devices connected to the network or used cloud based backup and data synchronization solutions. However, physical back-up local systems require additional equipment at significant expense. Cloud based data synchronization systems require less hardware at the local level but require a constant communication connection to remain effective.

Therefore, what is needed is a system which can provide data synchronization among networked devices already on the network allowing for continued data synchronization when communication with a cloud based system is lost while minimizing the need for dedicated local back-up systems.

SUMMARY OF THE INVENTION

The present invention provides a system, method, and solution for data synchronization among peer devices on a network and master device redundancy within the peer network. The system may be employed in combination with a cloud-based solution which also synchronizes and saves all data in a cloud storage system. The peer devices synchronize data among each other independent of the operating system since the data is synced via web services. The synchronization of data among peer devices may be wired or wireless via a router, Wi-Fi, Bluetooth, NFC or any other mechanism which enables data synchronization possible even when cloud service is unavailable.

The peer devices may be configured in a hierarchical structure, which designates a master, and the master communicates with the cloud-based service to synchronize data. The master then synchronizes data with the other peer devices in the hierarchy. New devices can be added to the peer devices and can join the hierarchy. Should the master device fail, the system employs various methods of identifying and configuring a peer device already in the system to take over as the master device. Priority of the peer devices in the hierarchical structure to create a new master can be established either manually or the system can be configured to decide on the priority through analysis.

The present invention also provides a system for synchronizing data across a network of devices comprising: a plurality of processor based devices within a computer network; a plurality of memory devices associated with a plurality of the processor based devices, wherein the memory devices store a plurality of data; at least one software application resident on a plurality of the processor based devices which provides instructions for transmitting data to one or more of the other devices, and receiving and storing data from at least one of the other processor based devices on the associated memory device, wherein the software application provides information on which of the processor based devices is identified as a master device, and instructions to identify a new master device in the event communication with the master device is interrupted.

In combination, the system of the present invention provides a peer device network which synchronizes data within the local network and synchronizes data with a cloud based schema. Thereby, the system can utilize a cloud-based solution whereby all the data is saved in the cloud storage. However, in the event the connection to the cloud solution falter, the system can continue to maintain full data synchronization amongst peer devices. Data can be synced between the peer devices independent of the operating system via web services. The flexibility of such a system enables constant data synchronization with the ability to add new devices to the set of peer devices and these new devices will join the hierarchical structure.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Figure 1:
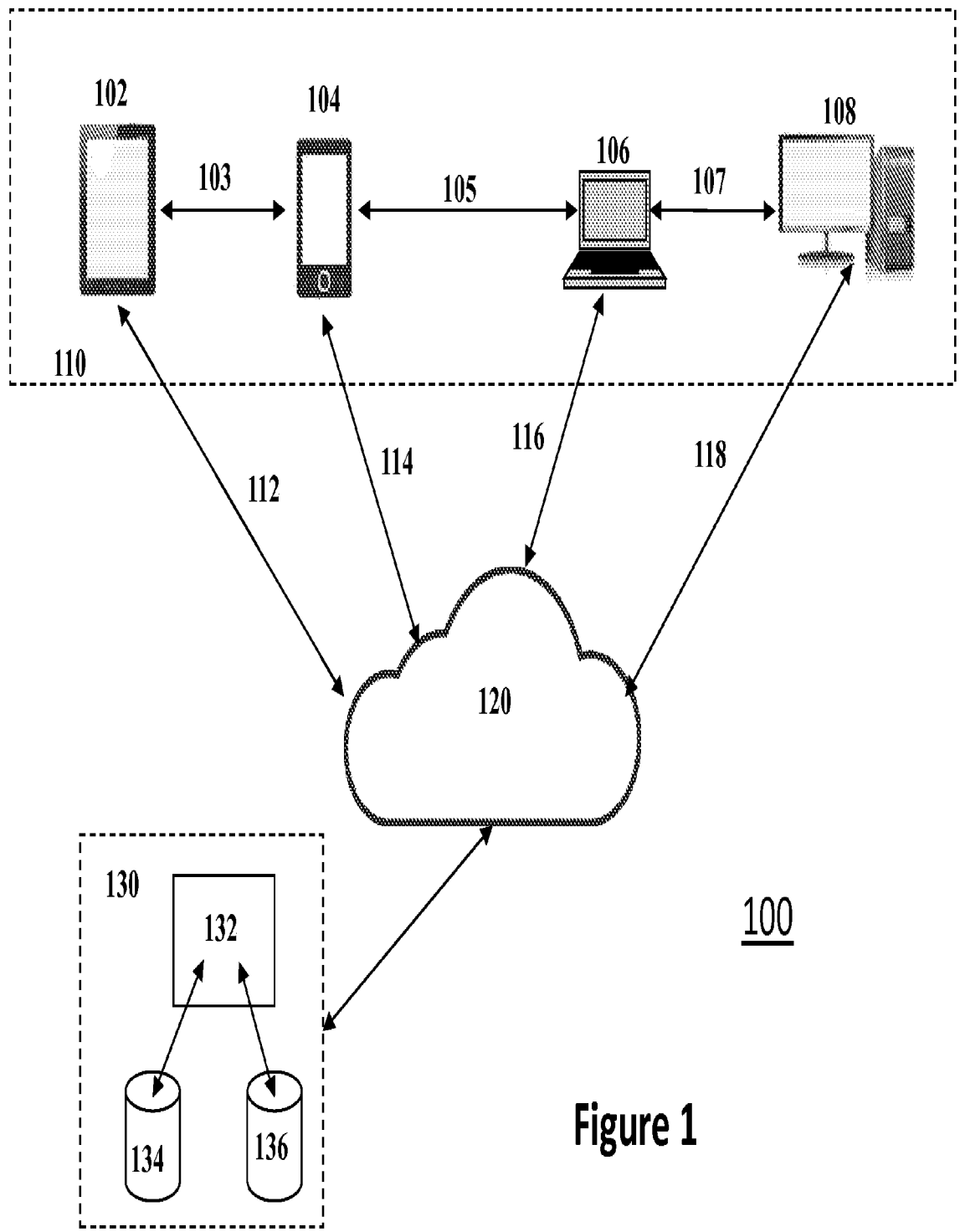
FIG. 1 depicts a system diagram of an exemplary system that enables data synchronization between a plurality of devices and a cloud-based web service without the need for a central server in accordance with this invention.

Particular embodiments of the present invention will now be described in greater detail with reference to the figures. Like reference numerals apply to similar parts throughout the several views.

The embodiments presented here are not meant to be exhaustive. Other embodiments using the concepts introduced in the present invention are possible. In addition, the components in these embodiments may be implemented in a variety of different ways.

As see in FIG. 1, the present invention can provide a fully synchronized system 100 where each device 102, 104, 106, 108 is connected through the internet 120 to a cloud based system 130 for data synchronization, data analysis, and real time decision making. The devices 102, 104, 106, 108 are within a local network 110 and each device 102, 104, 106, 108 can communicate with the other devices via communication paths 103, 105, 107. The communication may be through a router, Wi-Fi, Bluetooth, NFC, any other mechanism, or a combination of any such paths. Devices 102, 104, 106, 108 can be a mix of laptops 106, tablets 102, PCs 108, Android and/or iOS devices 104. The devices 102, 104, 106, 108 within the network 110 are also connected to the internet 120 via communication paths 112, 114, 116, and 118. The communication may be through a router, Wi-Fi, Bluetooth, NFC, any other mechanism, or a combination of any such paths. The cloud based system 130 is also connected to the internet 120 for communication with the network 110 or devices 102, 104, 106, 108. The cloud based system 130 may consist of one or many servers 132 which may save data across a multitude of internal or external databases or memory 134, 136.

In traditional or known systems, the devices 102, 104, 106, 108 within the network 110 can communicate locally with each other but they do not synchronize data among each other. In such traditional systems, the devices 102, 104, 106, 108 can be configured to communicate with the cloud 130 to synchronize data with the cloud but when the cloud 130 is unavailable, the network and devices 102, 104, 106, 108 lose their synchronization capability.

However, the present invention improves such traditional systems by providing a system 100 which enables the devices 102, 104, 106, 108 to synchronize data amongst the peer devices 102, 104, 106, 108 within the network 110. The synchronous replication, which is accomplished by software or computer programs or instructions resident on the devices 102, 104, 106, 108 writes data to the primary device (the device saving or storing data) in addition to a secondary device at the same time so that the data remains current between devices 102, 104, 106, 108. The system can be configured, as depicted in FIG. 1, where each device 102, 104, 106, 108 can communicate with each other, sync with each other, and sync with the cloud 130. The problem with contact syncing with a network of devices 102, 104, 106, 108 is the sync process can negatively impact the performance of the devices 102, 104, 106, 108. Thus, there is a desire to enable synchronization amongst devices 102, 104, 106, 108 and the cloud with a minimal impact on device 102, 104, 106, 108 operation.

In one embodiment, as seen in FIG. 1, the devices 102, 104, 106, 108 can each communicate directly with the cloud based system 130. The system can be implemented such that each system or device 102, 104, 106, 108 primarily syncs with the cloud based system 130 to limit the sync process to only one path. In such an embodiment, the system applications, computer programs, and related instructions still maintain the rules and logs around which devices act as synchronized devices for the data amongst devices. Therefore, in the event the cloud based system 130 is unavailable, the devices 102, 104, 106, 108 within local network 110 can immediately default to a sync from peer to peer methodology using devices 102, 104, 106, 108. Since it is likely that a device 102, 104, 106, 108 within the network 110 will have its data synced across more than one device the applications may also provide the sequence of data synchronization amongst peer devices 102, 104, 106, 108. Such a system allows the devices 102, 104, 106, 108 to remain synced at the cloud and locally but minimize performance loss by having each device 102, 104, 106, 108 primarily synced with the cloud with the peer device synchronization as a back-up. The problem with such a system is that each device 102, 104, 106, 108 may be in and out of communication with the cloud system 130 causing the system and devices 102, 104, 106, 108 to jump intermittently between a cloud synchronization or a local peer synchronization. However, the system of the present invention can be configured to perform sync routines amongst peer devices at set times or when resource demand for all or some of the devices 102, 104, 106, 108 is determined to be low.

Figure 2:
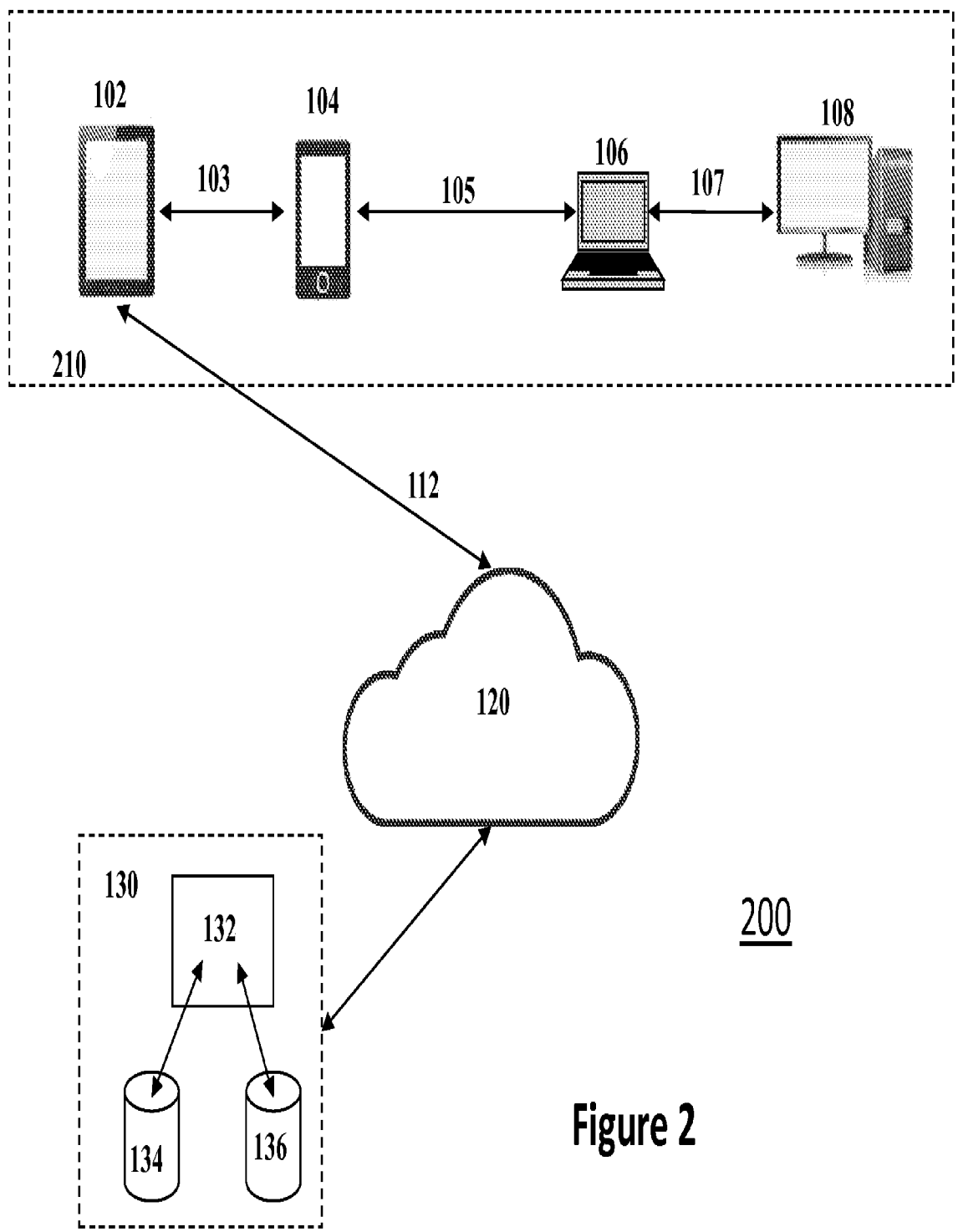
FIG. 2 depicts a system diagram of an exemplary system that enables data synchronization between a plurality of devices with a cloud-based web service in communication with the master device

In an additional embodiment, as seen in FIG. 2, the present invention enables a hierarchal based synchronization system 200 with a master device 102 and the cloud system 130 which provides or allows for designed structure on synchronization schema. Thus, the peer devices 104, 106, 108 are primarily being synced from only one device, the master device 102, which controls the data sync among all peer devices 104, 106, 108 and the cloud system 130. The system 200 provides a master device 102 which is connected to or in communication with the cloud based system 130 for data synchronization via the internet 120. The master device 102, and the devices 104, 106, 108 are within a network 210 and each device 102, 104, 106, 108 can communicate and synchronize data with the other devices in the network 210 via communication paths 103, 105, 107. The communication may be through a router, Wi-Fi, Bluetooth, NFC, any other mechanism, or a combination of any such paths. Devices 102, 104, 106, 108 could be a mix of laptops, tablets, PCs, Android and/or iOS devices. In this embodiment, only the master device 102 is within the network 210 and is configured to communicate with and synchronize data with the cloud system 130. The communication may be through a router, Wi-Fi, Bluetooth, NFC, any other mechanism, or a combination of any such paths. The master device 102 communicates individually with the cloud system 130 to synchronize data. The master device 102 also communicates locally with the devices 104, 106, and 108, and synchronizes data among the devices 104, 106, 108.

Figure 3:
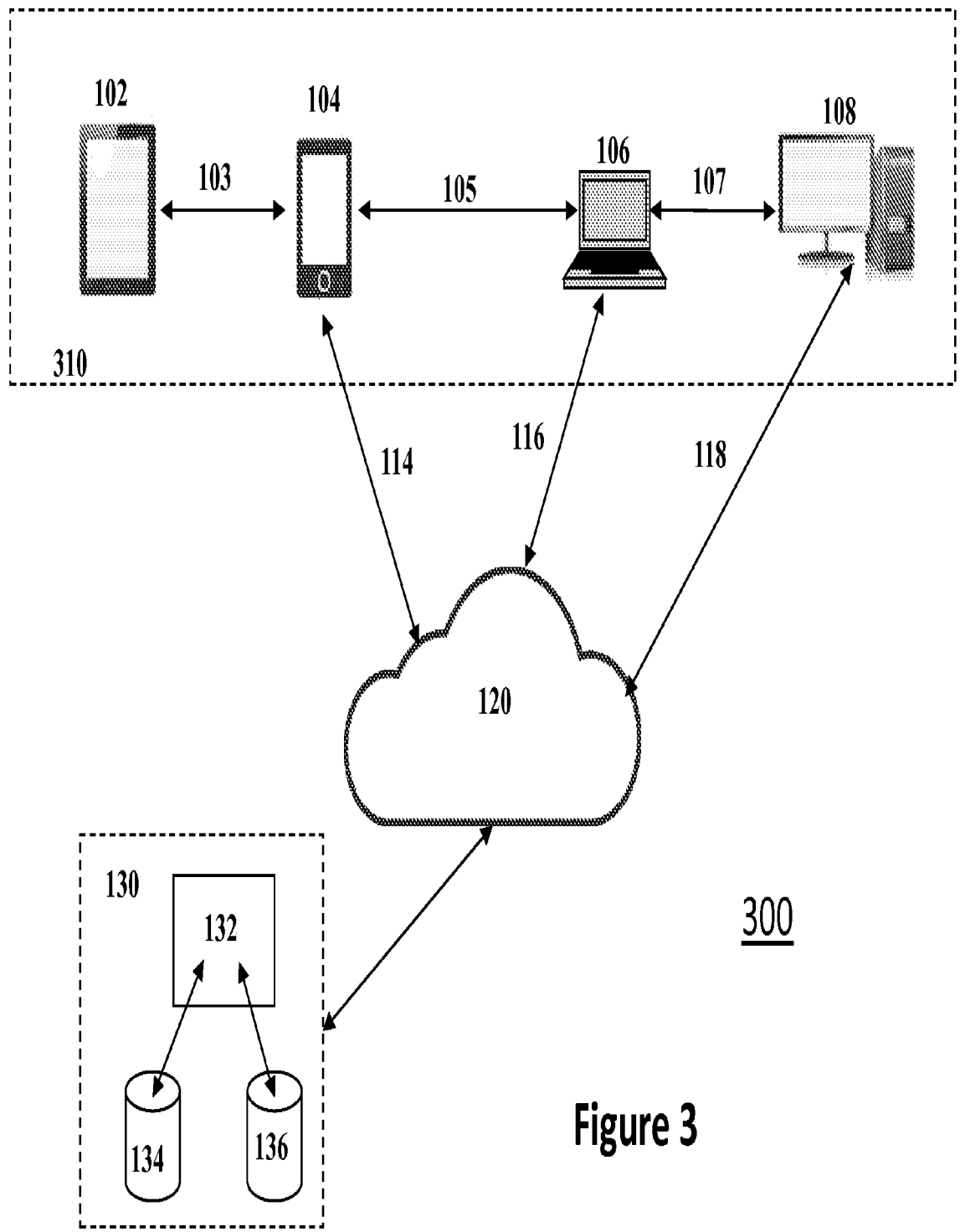
FIG. 3 depicts a system diagram of an exemplary embodiment that enables one of a plurality of devices to become the master device if the original master device fails.

In FIG. 3, we have a system 300 where the master device 102 from FIG. 2 has failed or lost connectivity with the cloud system 130 or lost connectivity with the secondary devices 104, 106, 108. The secondary devices 104, 106, and 108 are within network 310 and each device 104, 106, 108 can communicate and synchronize data with the other devices via communication paths 103, 105, and 107. The communication may be through a router, Wi-Fi, Bluetooth, NFC, any other mechanism, or a combination of any such paths.

Devices 102, 104, 106, 108 could be a mix of laptops, tablets PCs, Android and/or iOS devices. Devices 104, 106, 108 are connected to the internet 120 via communication paths 114, 116, and 118. The communication may be through a router, Wi-Fi, Bluetooth, NFC, any other mechanism, or a combination of any such paths. The cloud based system 130 is also connected to the internet 120 for communication with the network 310 or devices 104, 106, 108.

However, as described above, if the master device 102 has failed or lost connectivity or communication with the cloud system 130 another device 104, 106, 108 will need to become the new master device. The priority of devices 104, 106, 108 creates a new master device either manually or automatically. By way of example, if the new master device is 108 it now takes over primary communication and synchronization with the cloud system 130. In addition, the new master device 108 also communicates locally with devices 104 and 106 and synchronizes data among the network 310 devices 104, 106.

Figure 4:
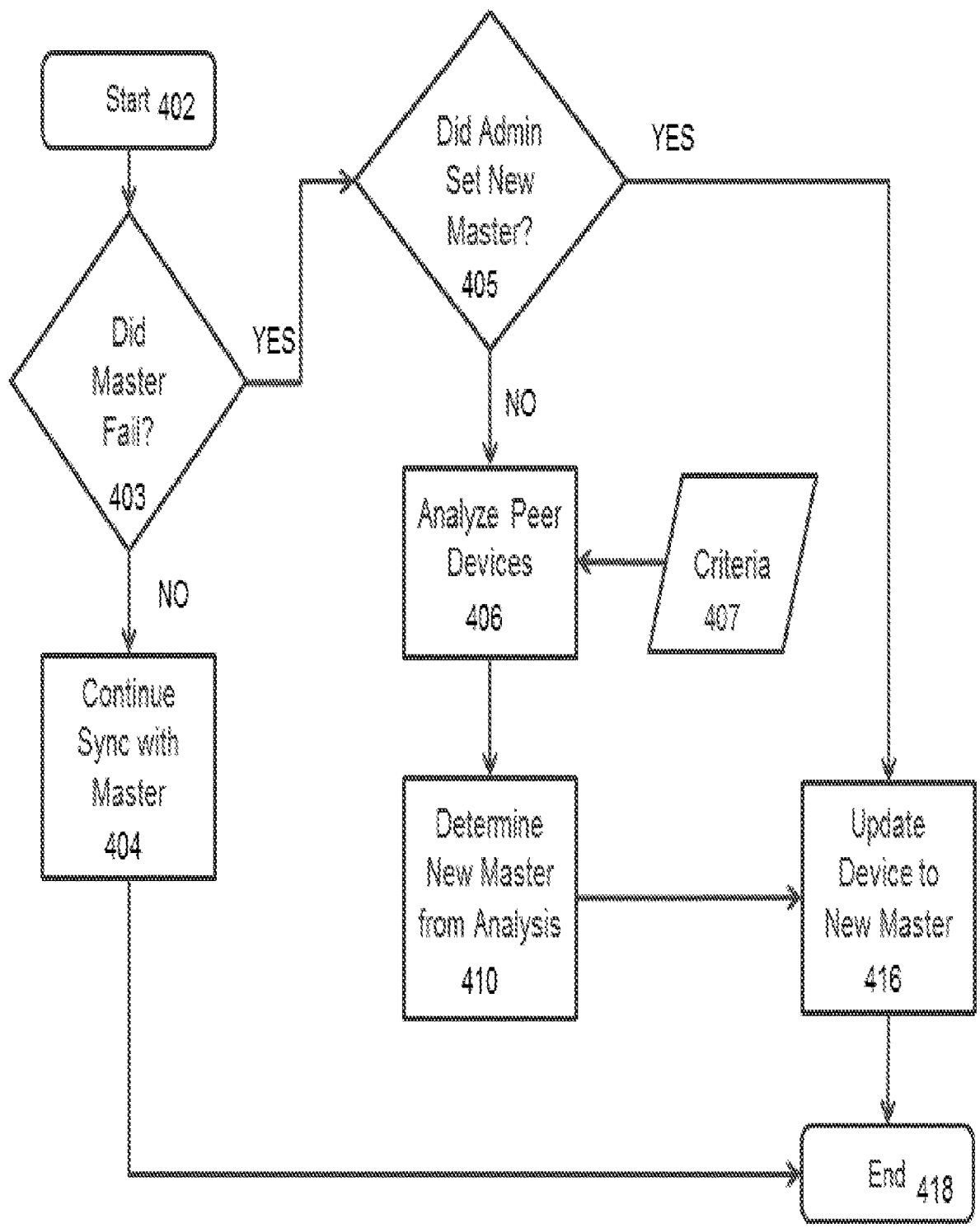
FIG. 4 is a flow chart diagram showing the method of identifying and creating the new master device upon failure of the original master device.
Figure 5:
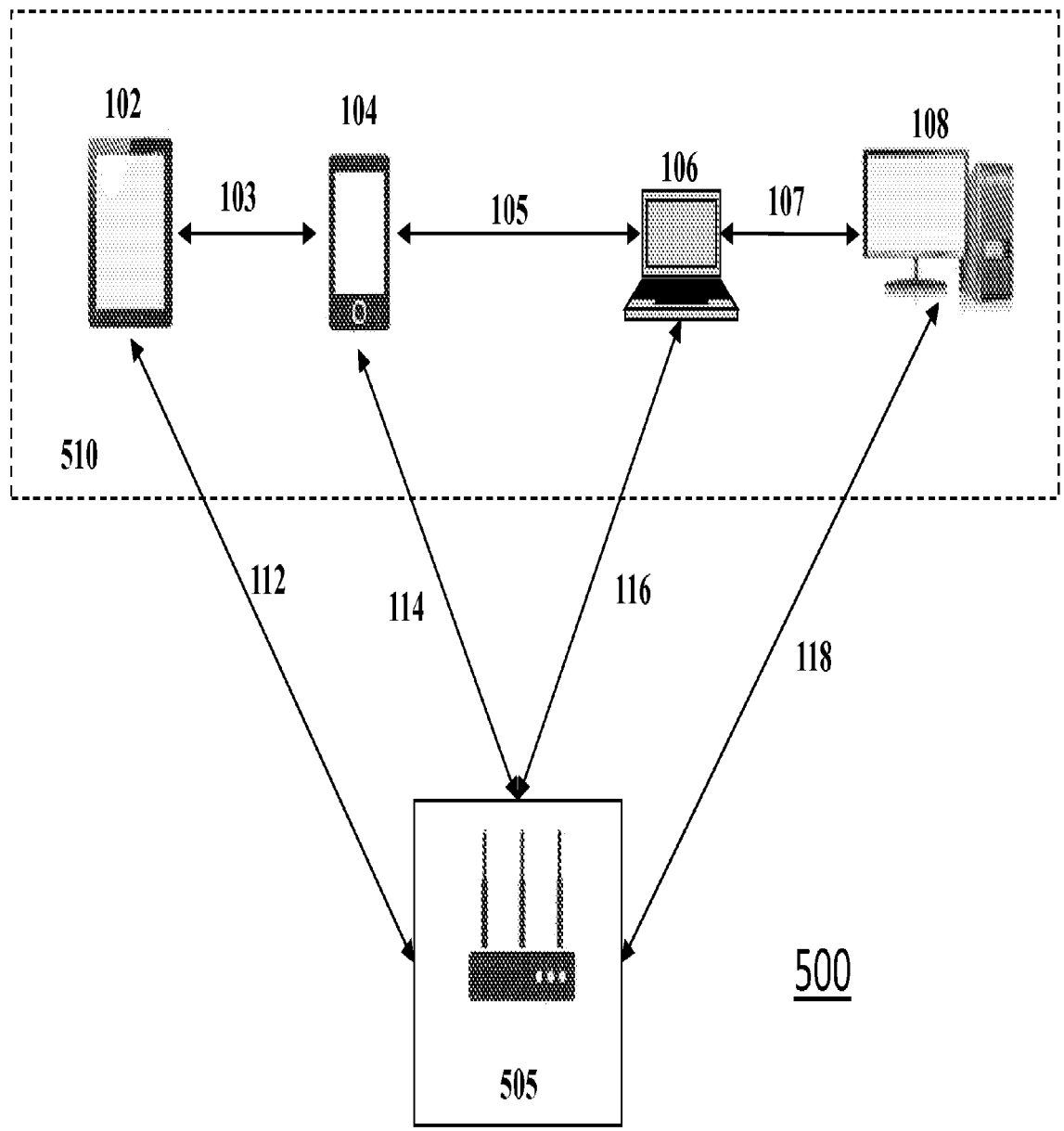
FIG. 5 depicts a system diagram of an exemplary system that enables data synchronization between a plurality of devices without a cloud-based web service

FIG. 4 provides a flowchart of the method 400 for determining the priority of devices to become the new master device in the event of failure of the original master device. Such determination can be established either manually or automatically. The devices maintain a "state configuration" and are aware of each other. At 402 the system is functioning as designed without incident. At 403 an inquiry is made as to the state of the master device. If the master has not failed, the master continues data synchronization (403) with the cloud as well as with the other devices in the network, and there is no further inquiry (418). However, if the master has failed, the system determines in step 405 whether an administrator has manually set a new master hierarchy (405).

The administrator can manually set a new master from the administration graphical user interface of the present invention. The hierarchy can be established based on many factors including which peer device most closely matches the failed master in terms of hardware components, software, configuration, operating system, or which of the devices can be converted to a new master in the shortest period of time, taking into account factors such as the percentage of master files already synced, RAM and processing power, or similar criteria. If the administrator has manually set a new master, then in step 416 the new master is updated within the system and the through a synchronized program or instruction install and data update that device is selected to be the new master. The new master can continue data synchronization with the cloud system as well as with the other devices in the network. Once the new master is updated and synchronization is ongoing the process of determining the new master is terminated in step 418.

In the event the administrator did not manually set the new master hierarchy (from step 405), the system in step 406 provides for an automatic selection of a new master by first analyzing the peer devices. The analysis is based on various criteria 407 the system automatically utilizes to analyze the peer devices. The criteria can be established by the administrator or can be determined using the software program or code of the analyzer provided with the system. Criteria may include analyzing specifications like age of the device, hardware components, software, configuration, operating system, or which of the devices can be converted to a new master in the shortest period of time, taking into account factors such as the percentage of master files already synced, RAM and processing power, or similar criteria. Priority can be established by an examination of the type of peer devices, proximity of the peer devices, computing capacity of the devices or other parameters that be configured at the time of the system design.

After the peer device analysis (steps 406 and 407), the system determines a new master (step 410) based on the analysis conducted at step 406 using the criteria from 407. The device selected as new master from step 410 is then updated to act as the new master in step 416. The new master synchronizes data with the cloud system and then synchronizes data with the other peer devices. Once the new master is updated and synchronization is ongoing the new master determination process is terminated in step 418.

In addition, the system 500 could be deployed without cloud synchronization where each device 102, 104, 106, 108 is connected through a local area network 510. The devices 102, 104, 106, 108 can communicate with the other devices via communication paths 103, 105, 107. The local area network 510 includes connecting the devices 102, 104, 106, 108 through one or more communication paths 112, 114, 116, 118 which may be through a router, Wi-Fi, Bluetooth, NFC, any other device (505), or a combination of any such paths and devices. The devices 102, 104, 106, 108 can be a mix of laptops 106, tablets 102, PCs 108, Android and/or iOS devices 104. The devices 102, 104, 106, 108 would each have the relevant software code installed and operational and would control the devices synchronization with the other devices within the network 510. The devices 102, 104, 106, 108 would also employ the same master or secondary protocol as previously discussed.

The benefits of the system and embodiments as described herein allow for easy synchronization and utilization of the devices already within the network. It allows for data backup and redundancy without the need to purchase external drives, or pay for cloud based systems. Further, it allows for easy replication of relevant data as new devices are added to the system. The data within the system can be encrypted and spread across multiple computers or devices providing additional security measures.

The examples provided herein are merely for the purpose of explanation and are in no way to be construed as limiting of the present method and product disclosed herein. While the invention has been described with reference to various embodiments, it is understood that the words which have been used herein are words of description and illustration, rather than words of limitation. Further, although the invention has been described herein with reference to particular means, materials, and embodiments, the invention is not intended to be limited to the particulars disclosed herein; rather, the invention expands to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

I claim:

1. A system for synchronizing data across a network of devices, the system comprising:
   a plurality of processor devices within a computer network;
   a plurality of memory devices associated with the plurality of processor devices, wherein the plurality of memory devices store a plurality of data;
   at least one software application resident on the plurality of processor devices, the at least one software application includes instructions when implemented perform processing including:
      transmit data to a receiving processor;
      receive a set of data from a sending processor; and
      store the set of data on a memory device;
   the at least one software application providing a set of information on which of the plurality of processors is identified as a master processor;
   a first processor of the plurality of processor devices determining communication with the master processor is interrupted;
   the first processor analyzing the plurality of processor devices to determine a set of attributes of each of the plurality of processor devices;
      the first processor selecting a new master processor device from the plurality of processor devices based on the analysis of the set of attributes of each of the plurality of processor devices; and
      the new master processor device controlling a hierarchical data synchronization of the plurality of processor devices using a data synchronization routine;
      the new master processor device controlling the hierarchical data synchronization amongst the plurality of processor devices according to a hierarchical sequence.

2. The system of claim 1, the plurality of processor devices includes synching data between at least two of the plurality of processor devices.

3. The system of claim 1, wherein the master device transmits data from the system to a cloud storage device.

4. The system of claim 1, wherein at least one of the plurality of processor devices is constituted by one of a laptop, PC, Android device or iOS device.

5. The method of claim 1, further comprising: limiting, by the master processor device, the data synchronization routine to synchronization between only two of the plurality of processor devices at a time.

6. The method of claim 1, further comprising: limiting, by the master processor device, the data synchronization routine to synchronization between the plurality of processor devices at a set time.

7. The method of claim 1, further comprising: limiting, by the master processor device, the data synchronization routine to synchronization between the plurality of processor devices in conjunction with the master processor determining that resource demand for one or more of the plurality of devices is low.

8. The system of claim 1, wherein the first processor device and second processor device are constituted by one of a laptop, PC, Android device or iOS device.

9. A system for synchronizing data across a network of devices, the system comprising:
   a master processor device and a second processor device within a computer network;
   a first memory device associated with the master processor device, wherein the first memory device stores a first set of data;
   a second memory device associated with the second processor device, wherein the second memory device stores a second set of data;
   at least one software application resident on the master processor device and the second processor device, the at least one software application includes instructions when implemented perform processing including:
      transmit data from the master processor device to the second processor device and transmit data from the second processor device to the master processor device;
      receive the first set of data by the second processor device from the master processor device and receive the second set of data by the master processor device from the second processor device; and
      store the first set of data on the second memory device and store the second set of data on the master memory device;
   the at least one software application providing a hierarchical sequence for data synchronization between the master processor device and the second processor device;
   the master processor device controlling the data synchronization between the first processor device and the master processor device according to the hierarchical sequence;
   the second processor determining communication with the master processor is interrupted; the second processor analyzing a plurality of additional processor devices within the network of devices to determine a set of attributes of each of the plurality of additional processor devices;
   the second processor selecting a new master processor device from the plurality of additional processor devices based on the analysis of the set of attributes of each of the plurality of processor devices;
   the new master processor device controlling a hierarchical data synchronization of the second processor device and the plurality of processor devices using a data synchronization routine; and
   the new master processor device controlling the hierarchical data synchronization amongst the second processor device and the plurality of processor devices according to a hierarchical sequence.

10. The system of claim 9, wherein the first processor device transmits data from the network of devices to a cloud storage device.

* * * * *